March 4, 1969     T. W. E. HANKINSON     3,430,460

FATIGUE-RESISTANT SHEAR PIN

Filed Feb. 28, 1967

*INVENTOR*
THOMAS W. E. HANKINSON

BY

*ATTORNEYS*

United States Patent Office 3,430,460
Patented Mar. 4, 1969

3,430,460
FATIGUE-RESISTANT SHEAR PIN
Thomas W. E. Hankinson, Hampton, Va., assignor to the United States of America as represented by the Administrator of the National Aeronautics and Space Administration
Filed Feb. 28, 1967, Ser. No. 619,903
U.S. Cl. 64—28    5 Claims
Int. Cl. F16d 9/00; B23g 9/00; B21k 1/44

ABSTRACT OF THE DISCLOSURE

A shear pin having a hollow shaft fitted with two plugs with chamfered ends that abut at the plane where shear is to occur on overload.

---

The invention described was made by an employee of the United States Government and may be manufactured and used by or for the Government for governmental purposes without payment of any royalties thereon or therefor.

This invention relates generally to a shear pin and more particularly to a multipart fatigue-resistant shear pin.

Previously known shear pins have been of various constructions and configurations but all have been susceptible to failure because of fatigue. Past experience has shown that shear pin couplings of the external groove type are subject to failure due to fatigue rather than overloading. After a short duration of application of the shear pin to its intended purpose, there is a reduction of capacity due to fatigue. Obviously this reduction in capacity gradually increases and results in the pin shearing at a lower rate of overload than is intended and, consequently, may cause undue damage to the various members involved.

In order to overcome the disadvantages of the prior art, it is an object of the instant invention to provide a fatigue-resistant shear pin.

Another object of this invention is to provide a shear pin having a pair of plugs pressed into a shaft.

A further object of the instant invention is to provide a shear pin having increased life without altering the overload shearing feature.

Generally, the foregoing and other objects are accomplished by utilizing a pair of plugs having a chamfered end inserted or pressed into a cylindrical shaft in a manner such that the chamfered faces of the plugs abut one another on the plane of shear.

Figure 1:
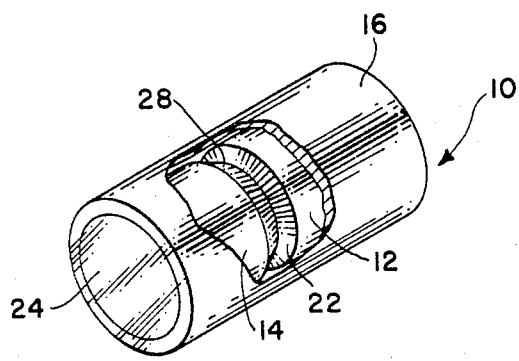
Figure 2:
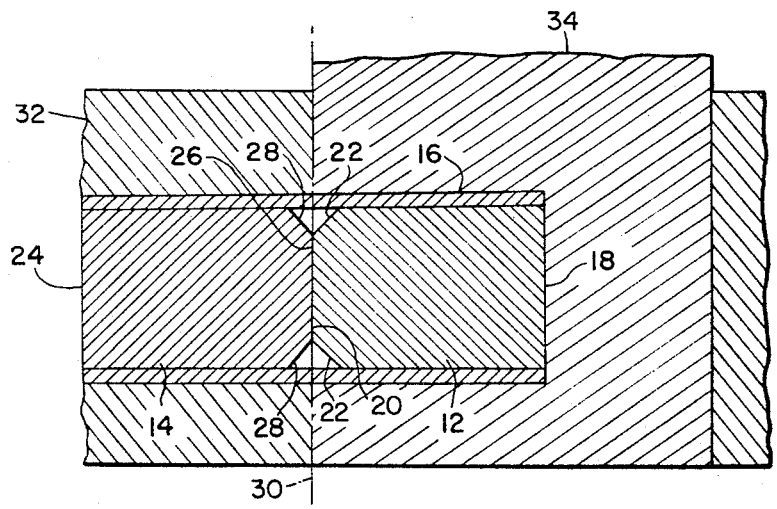

A more complete appreciation of the invention and many of the attendant advantages thereof will be readily apparent as the same becomes better understood by reference to the following description when considered in connection with the accompanying drawings wherein:

FIG. 1 is an isometic view, with portions cut away, of the instant inventive shear pin; and FIG. 2 is a longitudinal cross section through the shear pin of FIGURE 1 installed in a pair of driving members.

Referring now to the drawings wherein the instant shear pin 10 is shown to include a pair of plugs 12 and 14 pressed into hollow shaft 16. Plugs 12 and 14 are cylindrical and have external faces 18 and 24, respectively, that are flush or of a length substantially equal to shaft 16 when pressed thereinto. The other end of plugs 12 and 14, internal faces 20 and 26, respectively, abut at shear plane 30 where failure on overload is to occur. Internal faces 20 and 26 are chamfered at the perimeters thereof at 22 an 28, respectively. In use, the shear pin is drivingly connected to a pair of primary members which could be a pulley wheel 32 and a shaft 34 for example, so that the sleeve 16 tends to be transversely sheared by forces tending to produce relative movement therebetween, such as rotative or linear forces applied to the pulley 32 and resisted by the shaft 34. The plugs 12 and 14 are positioned so that their adjoining faces 20 and 26 are between these primary members and thus effectively position the shear plane of the sleeve at this same point. Thus, it is seen that a V-groove is formed about the circumference of the pair of plugs 12 and 14 internally of hollow shaft 16. This provides the advantages of the previously known V-groove shear pins without the disadvantages of fatigue failures.

It has been found that electropolished stainless steel bushings and hardened steel pins reduce surface corrosion, substantially. However, it is to be understood that the instant invention contemplates the utilization of any compatible materials. The instant design provides the required load capacity for shaft protection and has no groove to induce fatigue failure. Satisfactory service indicates that the instant shear pin has solved the problem of fatigue failure while furnishing the desired protection against shaft overload.

Obviously, many modifications and variations of the subject invention are possible in the light of the above teachings. It is therefore to be understood that within the scope of the appended claims the invention may be practiced otherwise than as specifically described.

What is claimed as new and desired to be secured by Letters Patent of the United States is:

1. A shear overload arrangement for producing controlled separation of a pair of primary members comprising:
   a hollow shaft member;
   means drivingly connecting a respective portion of said shaft member to each primary member so that relative movement therebetween tends to transversely shear said hollow shaft member;
   a pair of plugs slidably fitted into said hollow shaft and positioned so that the adjoining portions thereof are between said pair of primary members whereby the point of shear of said hollow shaft member can be controlled without notching or grooving thereof and resultant fatigue failures are eliminated.

2. The overload arrangement of claim 1 wherein said adjoining portions of said plugs are chamfered and positioned to abut each other whereby a discrete shear plane is produced.

3. A fatigue-resistant shear pin comprising:
   a hollow shaft member;
   plug means including a pair of plugs positioned within said hollow shaft member with adjoining portions thereof abutting each other, and the sum of the lengths of said plugs substantially equalling the length of said hollow shaft.

4. The fatigue-resistant shear pin of claim 3 wherein said plugs have chamfered edges on said abutting faces.

5. The fatigue-resistant shear pin of claim 4 wherein said hollow shaft is cylindrical and has an inside diameter substantially equal to the diameter of said plugs, whereby said plugs provide rigidity for said hollow shaft member.

References Cited

UNITED STATES PATENTS

| 724,684 | 4/1903 | Edwards | 64—28 |
| 2,727,371 | 12/1955 | Troeger et al. | 64—28 |
| 2,964,931 | 12/1960 | Sorenson | 64—28 |

HALL C. COE, *Primary Examiner.*

U.S. Cl. X.R.

10—23